United States Patent [19]

Taylor

[11] 4,447,979
[45] May 15, 1984

[54] FISH STRIKE ALARM

[76] Inventor: F. Hoyt Taylor, 420 Pebble Beach, SE., Grand Rapids, Mich. 49506

[21] Appl. No.: 474,181

[22] Filed: Mar. 10, 1983

Related U.S. Application Data

[63] Continuation-in-part of Ser. No. 409,152, Aug. 18, 1982, abandoned.

[51] Int. Cl.³ ............................................. A01K 97/12
[52] U.S. Cl. ...................................................... 43/17
[58] Field of Search ................................................ 43/17

[56] References Cited

U.S. PATENT DOCUMENTS

| | | | |
|---|---|---|---|
| 2,302,337 | 11/1942 | Mantell | 43/16 |
| 3,283,438 | 11/1966 | Wagner | 43/17 |
| 3,440,754 | 4/1969 | Slama | 43/17 |
| 3,521,393 | 7/1970 | Gordon | 43/17 |
| 3,599,368 | 8/1971 | Riley | 43/17 |
| 3,600,836 | 8/1971 | Miyamae | 43/17 |
| 3,702,513 | 11/1972 | Watts | 43/17 |
| 3,744,172 | 7/1973 | Kelli | 43/17 |
| 3,798,630 | 3/1974 | Crosthwait | 340/279 |
| 3,959,910 | 6/1976 | Montgomery | 43/17 |
| 3,992,797 | 11/1976 | Kazakevich | 43/17 |
| 4,051,616 | 10/1977 | Mathauser | 43/17 |
| 4,178,712 | 12/1979 | Williams | 43/17 |
| 4,235,036 | 11/1980 | Dawson | 43/17 |
| 4,250,649 | 2/1981 | Harrington et al. | 43/16 |
| 4,266,217 | 5/1981 | Kao et al. | 340/573 |
| 4,276,711 | 7/1981 | Mathauser | 43/17 |
| 4,384,425 | 5/1983 | Lemons | 43/17 |

*Primary Examiner*—Gene P. Crosby
*Attorney, Agent, or Firm*—Price, Heneveld, Huizenga & Cooper

[57] ABSTRACT

The specification discloses a fish strike alarm usable in both taut-line and slack-line fishing. The alarm includes a housing hingedly mountable on a rod, a spring-loaded line switch extending from the housing, and a clip for releasably securing the fish line over the line switch so that the switch is depressed when the line is drawn taut. The alarm further includes a light and buzzer and a selector switch to actuate the light and buzzer when the line switch is either depressed or released. In an alternative embodiment of the invention, the line switch is responsive to the line being slack, at a first tension, or at a second higher tension. The alarm in the alternative embodiment is sounded when the line is either slack or at the second tension.

26 Claims, 7 Drawing Figures

FISH STRIKE ALARM

BACKGROUND OF THE INVENTION

This application is a continuation-in-part of my copending application Ser. No. 409,152, filed Aug. 18, 1982, entitled FISH STRIKE ALARM FOR SLACK OR TAUT LINE, now abandoned.

The present invention relates to fishing apparatus and more particularly to a fish strike alarm to be mounted on a pole or pole holder.

Typically, while fishing, the fisherman must wait for extended periods of time after he has cast his line into the water and set his pole before a fish strikes the line. Particularly when "the fish are not biting", this waiting can be quite tedious and even boring. Consequently, a fisherman will often partake in recreational and other diversions while waiting for a strike, not paying full attention to the set poles. If the fisherman is absorbed in some diversion, or otherwise inattentive, when a fish strikes, he may not note the strike and lose the fish.

Accordingly, a wide variety of fish strike alarms have been developed to be mounted on fishing poles to indicate, for example by audible signal, when a fish has struck the line. The fisherman can then take the appropriate steps necessary to complete the catch. However, these prior fish strike alarms are not without their drawbacks.

One type of fish strike alarm includes one or more strain gages mounted along the length of the rod to detect flexure of the rod. Because a rod typically flexes when a fish strikes the line, the strain gages are responsive to strikes. Examples of this type of device may be seen in U.S. Pat. No. 4,276,711, entitled FISHING ROD WITH STRIKE SIGNALING APPARATUS and issued July 7, 1981, to Mathauser; U.S. Pat. No. 4,051,616, entitled ROD WITH STRIKE SIGNALING APPARATUS and issued Oct. 4, 1977, to Mathauser; and U.S. Pat. No. 2,302,337, entitled SIGNAL ATTACHMENT FOR FISHING POLES and issued Nov. 17, 1942, to Mantel. However, these devices are relatively complicated and consequently expensive. Second, the strain gages are relatively delicate and therefore difficult to adjust and transport.

Another type of device includes an electric circuit comprising an alarm means and a pair of contacts movable relative one another to open and close the circuit. Further, provided, is a means of moving one contact into engagement with the other when the fish line is drawn taut, as would happen when a first strikes the line. When the contacts engage one another, the alarm is sounded. Examples of this type of device may be seen in U.S. Pat. No. 4,266,217 entitled SIGNAL DEVICE FOR FISHING RODS and issued May 5, 1981, to Kao et al and U.S. Pat. No. 3,959,910 entitled FISHING SIGNAL DEVICE and issued June 1, 1976, to Montgomery.

Yet another device includes an electric circuit including an alarm and a pair of contacts biased toward one another which, when closed, complete the electric circuit, sounding the alarm. After the fish line is set, the fish line is positioned between the contacts, holding the contacts open. The line, when drawn taut, for example when a fish strikes, is pulled from its position between the contacts, allowing the contacts to close, sounding the alarm. However, this device, as well as all of the devices described herein, are suitable for use only in slack-line fishing. That is to say that the devices are only operable when the line is slack while waiting for the fish to strike. These devices are not suitable for use in taut-line fishing using downriggers or outriggers, wherein the line is drawn taut by the outrigger or downrigger until the fish strikes, at which time the line is relased so that the line goes slack.

SUMMARY OF THE INVENTION

The aforementioned problems are solved by the present invention wherein a fish strike alarm is provided suitable for use in taut-line fishing. More specifically, the alarm includes a housing mountable on a fishing pole, a spring-loaded switch supported on the housing and engageable by the fish line to be movable between first and second positions, a clamping means secured to the housing for securing the line proximate the switch such that the switch is responsive to whether the line is taut or slack, and an alarm means supported in the housing responsive to the position of the switch for sounding an alarm only when the line is slack. The strike alarm is mounted on a rod set for taut-line fishing, for example using an outrigger or downrigger. The line is secured in the clamping means and proximate the switch such that the line actuates the switch when going from taut to slack, or vice versa. When a fish strikes the line, the line is released from the outrigger and goes slack, actuating the switch and sounding the alarm, indicating to the fisherman that a fish is on the line.

In a first preferred embodiment of the invention, the first strike alarm is selectively suitable for use in either taut-line or slack-line fishing. A selector switch is furher included and supported on the housing to be switchable between first and second states. The alarm means is also responsive to the selector switch to sound the alarm only when the selector switch is in the first state and the line switch is in the first position or when the selector switch is in the second position and the line switch is in the second position. Consequently, this strike alarm may be used in either slack-line or taut-line fishing depending on the state of the selector switch. The clamping means maintains the slack or taut line in position proximate the switch. When taut-line fishing, the selector switch is switched to the first state so that the alarm sounds when the line goes slack. When slack-line fishing, the selector switch is switched to the second state so that the alarm sounds when the line is drawn taut.

In another preferred embodiment of the invention, the fish strike alarm includes means for detecting when the fish is "mouthing" the bait during taut-line fishing. The term "mouthing" means that the fish has taken the baited hook into his mouth but has not yet closed on the lure sufficiently to become hooked. Often, the fish can mouth the bait and spit it out before becoming hooked. If the line is sharply jerked while the fish is mouthing the bait, the fish will often become hooked. Therefore, the detection of "mouthing" enables the fisherman to jerk the line sharply at appropriate times to hook the fish.

The spring-loaded switch in the second embodiment is movable between first, second, and third positions responsive to the tautness of the fish line. More specifically, the slack line releases the spring-loaded switch to the first position; a slightly taut line moves the switch to the second position; and a more taut line moves the switch to the third position. The alarm means is responsive to the spring-loaded switch to operate when the switch is in either the first or third positions. Consequently, this embodiment of the strike alarm may be used in taut-line fishing to detect both positive strikes and "mouthing" of the bait. More particularly, the alarm is set by drawing the line over the spring-loaded switch and securing the line in the clamping means. The line therefore forces the spring-loaded switch into the second position wherein the alarm means is inoperative. When a positive strike is made, the line which is thereby released from the torpedo goes slack, and the spring-loaded switch is released to its first position wherein the alarm means is operated. If the fish simply mouthes the bait, the tension on the taut line is increased sufficiently to draw the spring-loaded switch into its third position, also sounding the alarm means. In either case, the fisherman can take appropriate action to complete the catch.

These and other objects, advantages, and features of the invention will be more fully understood and appreciated by reference to the written specification and appended drawings.

DESCRIPTION OF THE PREFERRED EMBODIMENT

Figure 1:
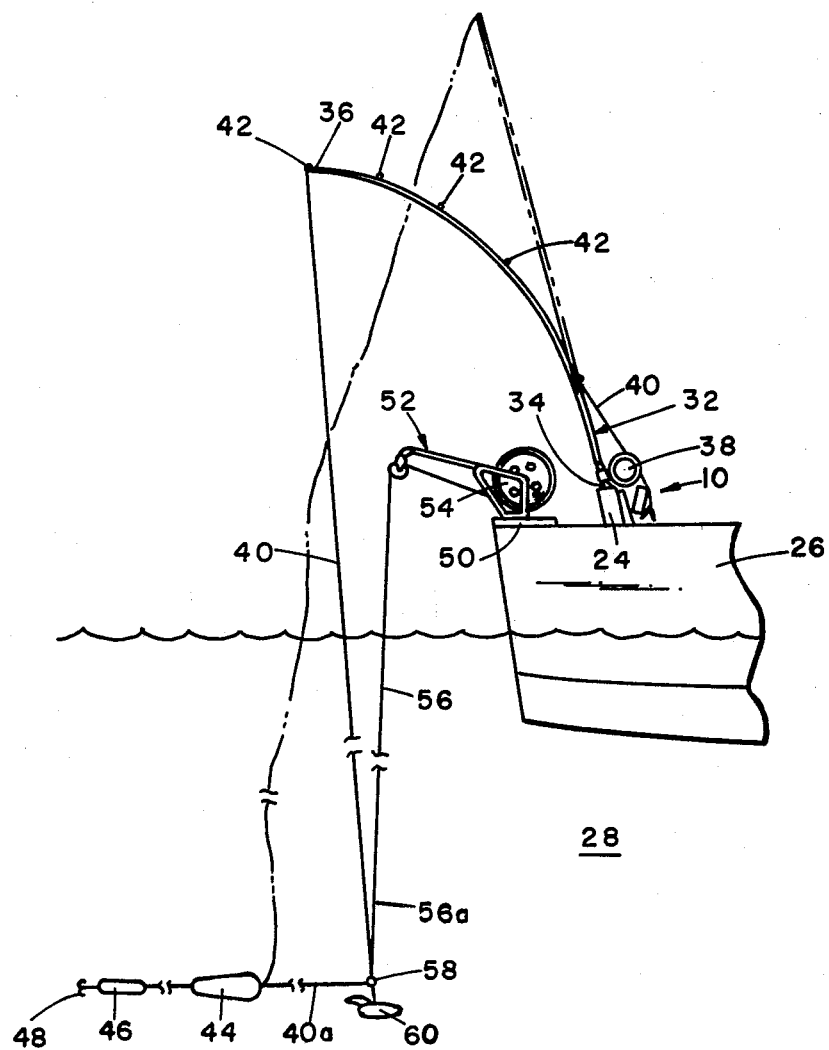
FIG. 1 is a fragmentary, elevational view of the fish strike alarm of the present invention used in conjunction with a downrigger.

A fish strike alarm constructed in accordance with a preferred embodiment of the invention is illustrated in the drawings and generally designated 10. As most clearly seen in FIGS. 2 and 3, alarm 10 includes housing 12, line switch 14, and selector switch 15 supported within the housing, and clamp 16 secured to the housing by chain 18. As seen in FIG. 4, switches 14 and 15 are electrically connected in series with alarm 19. Housing 12 in turn includes mounting platform 20 to which are secured a pair of straps 22 releasably securable about a fishing pole holder 24 or pole.

Figure 2:
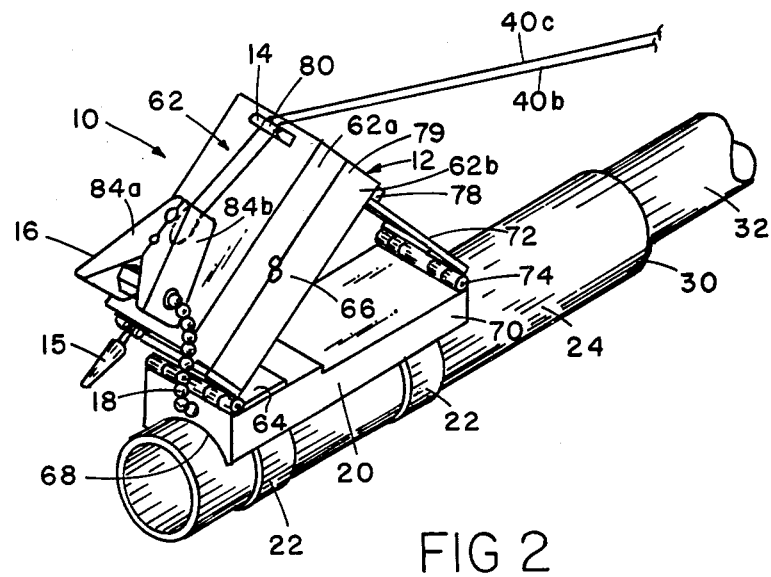
FIG. 2 is a fragmentary, perspective view of the fish strike alarm mounted on a pole holder.

One environment in which fish strike alarm 10 may be used is illustrated in FIG. 1. A pole holder 24 is supported on boat 26 which in turn floats in water 28. As also seen in FIG. 2, pole holder 24 is a generally tubular member open at its upper end 30 to receive fishing pole or rod 32. Returning to FIG. 1, pole 32 includes a handle 34 and an opposite free end 36. Reel 38 is mounted on handle 34, with line 40 partially spooled thereon. Line 40 extends from reel 38 through a plurality of rings 42 mounted along the length of rod 32. At its free end 40a, line 40 is sequentially connected to flasher, or dodger, 44 and lure 46 having hook 48 thereon. Also mounted on boat 26 using mounting bracket 50 is downrigger 52, including reel 54 and wire line 56 extending therefrom. At its free end 56a, line 56 is sequentially fastened to quick-release mechanism 58 and torpedo 60. Line 40 is also connected to quick-release mechanism 58 thereby flexing rod 32.

After outrigger 52 and rod 32 have been set as described above and illustrated in FIG. 1, line 40 is secured to fish strike alarm 10 as illustrated in FIG. 2. Line 40 from reel 38 is secured in clamp 16. Because line 40 is drawn taut by torpedo 60, switch 14 is depressed. Selector switch 15 is then switched so that alarm 19 will be actuated when switch 14 is released. Consequently, when a fish strikes lure 46, line 40 is released from quick-release mechanism 58 to go slack as indicated in phantom in FIG. 1. Slack line 40 releases switch 14 which springs open completing a circuit with selector switch 15 and alarm 19 indicating to the fisherman that a fish has struck the line. The fisherman may then take immediate action to complete the catch.

Turning specifically to the construction of alarm 10 (FIGS. 2 and 3), it is seen that housing 12 includes box 62, mounting platforms 20, and hinge 64 interconnecting the box and the platform. Box 62 is plastic and generally rectangular in any cross section, comprising hinged box halves 62a and 62b which may be secured closed as illustrated using closure mechanism 66. Rib 78 is secured to the underside of lower half 62b directly under front end 79 of box 62. Aperture 77 (FIG. 3) extends through box half 62a generally opposite rib 78 to accommodate switch 14. As seen in FIG. 2, mounting platform 20 has a generally concave underside 68 which interfits with pole holder 24. Straps 22 are secured to underside 68 and comprise hook and loop fasteners which may be releasably secured about pole holder 24 or pole 32. At the forward end 70 of platform 20 support leg 72 is hingedly connected to the platform using hinge 74.

Figure 3:
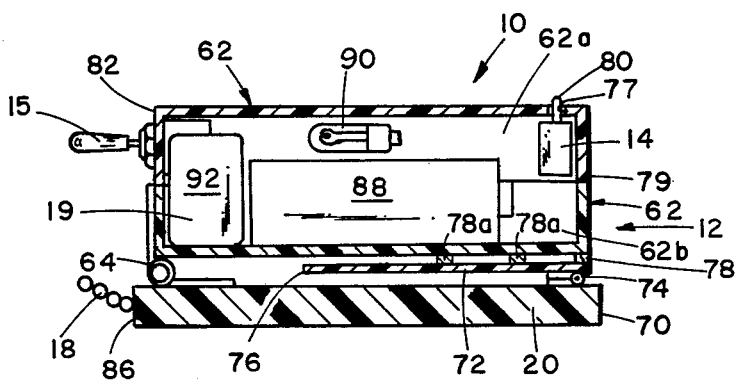
FIG. 3 is a sectional view of the fish strike alarm when collapsed.
Figure 4:
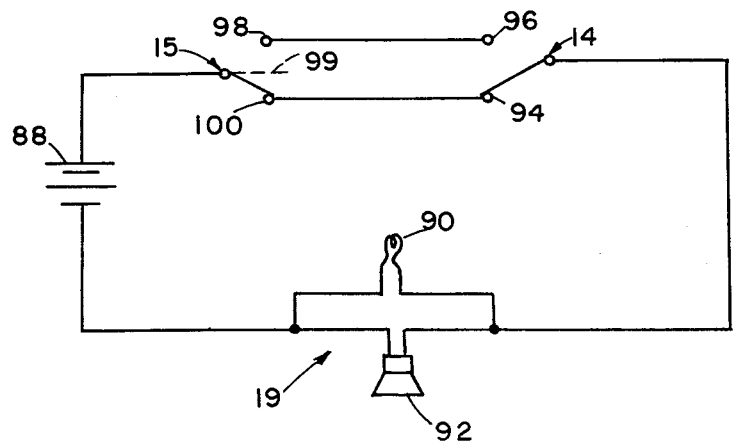
FIG. 4 is a schematic diagram showing the electric components of the fish strike alarm.

Box 62 is movable between a collapsed position as shown in FIG. 3 or an extended position as illustrated in FIG. 2. Housing 12 is moved to its collapsed position by first folding leg 72 against platform 20 about hinge 74 and then folding box 62 against leg 72 about hinge 64. To move housing 12 to the extended position, box 62 is pivoted upwardly about hinge 64 and leg 72 is pivoted upwardly so that free end 76 of leg 72 rests against rib 78 on box 62. Optionally, a plurality of ribs 78a similar to 78 are secured along the length of the underside of lower half 62b to support leg 72 in any one of a plurality of positions.

Switch 14 (FIGS. 2 and 3) is mounted within box 62 and more particularly upper box half 62a. Actuating arm 80 extends from switch 14 through aperture 77 in housing 62 and reciprocates in a direction generally transverse to line 40 secured thereover. Preferably, switch 14 is a spring-loaded microswitch with arm 80 biased to an extended position. Arm 80 is covered with a slightly compressible, adhesive material to improve friction between line 40 and the arm. To facilitate the proper actuation of switch 14 by line 40, actuating arm 80 is relatively wide in the direction generally transverse to the line.

Selector switch 15 (FIGS. 2, 3, and 4) is a three-position switch mounted in the rear end 82 of upper box half 62a. Switch 15 is movable between a first position, or state, in contact with terminal 98, a second position in contact with terminal 100, and a third, or off, position 99 not in contact with either terminal wherein alarm 19 is disabled.

Clamp 16 (FIG. 2) is a clothespin-type device having a pair of opposed jaws 84a and 84b biased to a closed position as illustrated in FIG. 2. Clamp jaws 84 are preferably covered with a slightly adhesive material to improve engagement with a clamped object. Chain 18 is secured to both jaw 84b and the rear end 86 of mounting platform 20. Chain 18 is anchored generally in the center of rearward end 86 and is sufficiently long so that clip 16 may be positioned on top of box 62. Line 40 is pinchingly received between jaws 84 which maintain line 40 aligned with, or positioned over, switch 14, and more particularly arm 80.

The electrical components within box 62 are illustrated in FIGS. 3 and 4. Alarm 19 is powered by a standard nine-volt battery 88 and comprises light 90 and buzzer 92 connected to each other in parallel. Switches 14 and 15 are connected in series with alarm 19 and battery 88. Switch 14, when depressed, makes contact with terminal 94 and when undepressed, or released, makes contact with terminal 96. Switch 15 when in a first state, or position, makes contact with terminal 98 and when in a second state, or position, makes contact with terminal 100. Terminals 94 and 100 are electrically connected to one another while terminals 96 and 98 are also electrically connected together. Consequently, the circuit is completed through alarm 19 only when switch 14 engages terminal 94 and switch 15 engages terminal 100 or when switch 14 engages terminal 96 and switch 15 engages terminal 98. Switch 15 may be operated to determine whether alarm 19 will be sounded when switch 14 is either depressed or released.

Taut-Line Operation

Before fish strike alarm 10 can be armed, rod 32 and downrigger 52 must be set up as illustrated in FIG. 1. Rod 32, and more particularly handle 34, is inserted into pole holder 24. Line 40 is secured to quick-release mechanism 58, and line 56 is deployed from downrigger 52 so that torpedo 60 is lowered into the water. In one preferred operating environment, torpedo 60 weighs approximately 8 pounds, and approximately 100 feet of line 56 are deployed. Of course, the particular weight of torpedo 60 and length of line 100 will depend upon many variations in fishing conditions and other considerations. As torpedo 60 is lowered, line 40 is played from reel 38 until the torpedo has been fully lowered to its desired depth. The slack in line 40 is then taken up by reeling the line in onto reel 38 so that rod 32 is flexed as shown in FIG. 1.

If not done so already, fish strike alarm 10 is then secured to pole holder 24 by placing mounting platform 20 against the pole holder and securing straps 22 about the holder (FIG. 2). Box 62 is raised to its operative position, and leg 72 is raised to support the box. Line 40 is drawn rearwardly, or downwardly, from reel 38 over arm 80 of switch 14 and secured within clamp 16. Due to the fact that line 40 is taut, switch 14 is depressed by line 40 so that the switch makes engagement with terminal 94 (see also FIG. 4). Selector switch 15 is then moved so that contact is made with terminal 98. Because terminals 94 and 98 are not electrically connected, no circuit is completed and alarm 19 remains silent.

When a fish strikes lure 46, line 40 is released from mechanism 58 and rod 32 snaps upwardly as shown in phantom in FIG. 1 causing the line to go slack. Slack line 40 releases spring-loaded switch 14 into contact with terminal 96. Because terminals 96 and 98 are electrically connected, a circuit is completed through battery 88 and alarm 19 so that light 90 illuminates and buzzer 92 sounds, indicating to the fisherman that a fish has struck the line. The fisherman may then take appropriate action to complete the catch.

Alarm 10 can be similarly used in other taut-line fishing, for example in ocean fishing in conjunction with an outrigger.

Slack-Line Operation

Alarm 10 is adapted for use in slack-line fishing by moving switch 15 into engagement with terminal 100 rather than terminal 98 as described above. Typical slack-line conditions include still fishing and low-drag trolling. When so used, device 10 may be secured directly to rod 32 rather than a pole holder such as 24. Line 40 is played from reel 38 to the desired length and then secured in clamp 16 over switch 14. When still fishing or low-drag trolling, unless a fish is on the line, line 40 will exert insufficient force on switch 14 to depress the switch. Consequently, no circuit will be completed through alarm 19 so that the alarm remains silent. When a fish strikes line 40, the line is drawn taut over switch 14 depressing the switch into engagement with terminal 94. Because terminals 94 and 100 are electrically connected, a circuit will be completed through alarm 19, causing light 90 to illuminate and buzzer 92 to sound.

Alternative Embodiment

Figure 5:
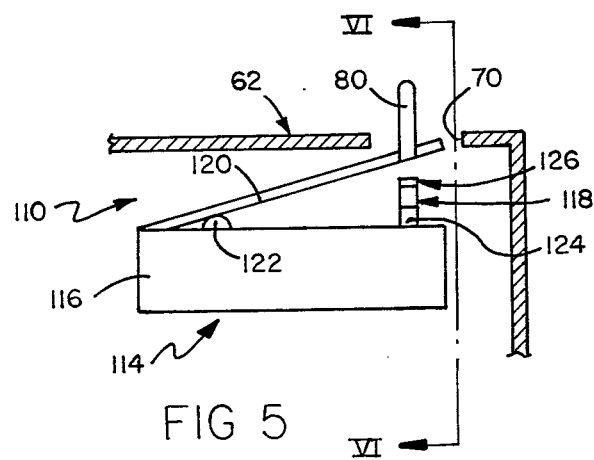
FIG. 5 is a fragmentary elevational view similar to FIG. 3 of an alternative embodiment of the line switch.
Figure 6:
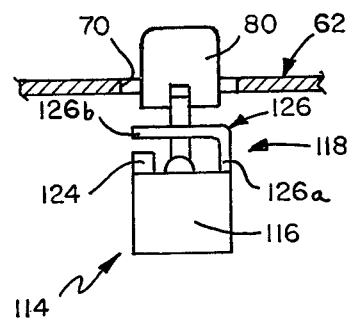
FIG. 6 is a view of the line switch taken along plane VI—VI in FIG. 5.
Figure 7:
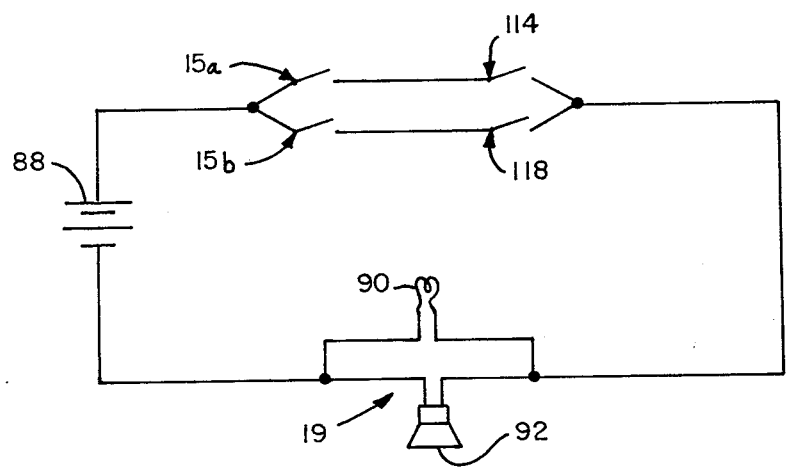
FIG. 7 is a schematic diagram showing the electric components of the fish strike alarm incorporating the alternative line switch.

An alternative embodiment 110 of the fish strike alarm is illustrated in FIGS. 5-7. The only difference between alternative strike alarm 110 and the strike alarm 10 previously described is the substitution of switch 114 for that of switch 14 and the associated changes required in the electric circuitry as illustrated in FIG. 7. More specifically, switch 114 includes a microswitch 116 and a single pole switch 118. As is generally well-known in the art, microswitch 116 includes a lever arm 120 bearing against switching element 122 which is biased upwardly into the position shown in FIGS. 5 and 6. Actuating arm 80 is mounted on lever arm 120 to extend through aperture 70 in upper cover half 62. Switching element 122 closes microswitch 114 when released and opens the microswitch when depressed.

Single pole switch 118 (FIGS. 5 and 6) is mounted on microswitch 116 and is electrically independent thereof. More particularly, switch 118 includes a first terminal 124 and a second L-shaped terminal 126, including an upstanding leg 126a and a lateral leg 126b extending generally perpendicularly from support leg 126a to a position above terminal 124. L-shaped terminal 126 is fabricated of a flexibly resilient material such as brass to assume the unbiased shape shown in FIGS. 5 and 6 wherein switch 118 is open. When depressed, leg 126b engages terminal 124 to close switch 118.

The electrical connection of switches 114 and 118 is illustrated in FIG. 7. As in the previous embodiment, voltage source 88 and alarm 19 are electrically connected in series. Alarm 19 in turn comprises lamp 90 and buzzer 92 connected in parallel. Double pole switch 15 of the first embodiment 10 is replaced in the strike alarm 110 by two single pole selector switches—15a coupled in series with microswitch 114 and 15b coupled in series with switch 118. Switches 15a and 114 are together coupled in parallel with switches 15b and 118 together. Consequently, alarm 19 will be actuated when either (1) both of switches 15a and 114 are closed or (2) both of switches 15b and 118 are closed.

Alternate strike alarm 110 can be used in (1) slack-line fishing, (2) taut-line fishing where "mouthing" is not to be detected, or (3) taut-line fishing where "mouthing" is to be detected. When alarm 110 is to be used for slack-line fishing, selector switch 15a is opened, while selector switch 15b is closed. Consequently, only the closing of switch 118 can effect the operation of alarm 19. More particularly, the slack line is trained over actuating arm 80 as described with the previous embodiment. When the line is drawn tight, for example when a fish strikes the line, arm 80 will be forced downwardly into case 62. Therefore, arm 120 forces terminal leg 126b into contact with terminal 124 to close switch 118, sounding alarm 19.

As a second option, alternative alarm 110 can be used in taut-line fishing where "mouthing" is not to be detected. In this case, selector switch 15a is closed while selector switch 15b is opened so that only the closing of microswitch 14 can effect operation of alarm 19. The line drawn taut during trolling is directed over lever arm 80 which is forced downwardly in case 62 depressing switching element 122 to open switch 114. When a fish strikes the line, line 40 is released from quick-release 58 so that the line goes slack, and switching element 122 is released closing switch 114. Therefore, a circuit is completed through switches 15a and 114 to actuate alarm 19, illuminating lamp 90 and sounding buzzer 92.

Third, alternative alarm 110 can be used in taut-line fishing where "mouthing" is to be detected. In this case, both of selector switches 15a and 15b are closed, so that closure of either of switches 114 or 118 will actuate alarm 19. After line 40 is set for trolling, the line is secured in clamp 16 across actuating arm 80 which is depressed into case 62 to a point where switching element 122 is depressed to open microswitch 114 and wherein lateral arm 126b is not depressed so that switch 118 is also open. After line 40 has been secured in clamp 16, it may be necessary to vary the angular orientation of case 62 with respect to the rod to produce the proper tension on actuating arm 80 so that neither of switches 114 and 118 are closed. Container 62 may be supported in the desired angular orientation by placing an object other than support leg 76 between base 20 and case 62. When a fish is not affecting the lure, the tension on line 40 during trolling will remain relatively constant, and alarm 19 will not be actuated. However, when a fish "mouths" the bait on the lure, the tension on line 40 is increased sufficiently to force actuating arm 80 into case 62 until switch arm 120 forces terminals 126b and 124 into contact with one another closing switch 118. Consequently, alarm 19 will sound whenever a fish mouths the bait. When receiving the alarm signal, the fisherman jerks the line to secure the hook in the fish's mouth and complete the catch. Alternatively, if the fish strikes the line sufficiently hard to pull line 40 from quick-release 58, the line goes slack, and switching element 122 rises upwardly to close switch 114 also sounding the alarm. Therefore, the alarm is sounded when either a positive strike is made or when a fish is mouthing the bait such that the line should be jerked.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A fish strike alarm for a fishing rod and reel, the rod having a handle end on which the reel is mounted and a free end, the rod and reel together supporting a fish line, said alarm comprising:
    a housing operably connectable to the rod opposite the reel from the free end;
    clamping means supported on said housing for releasably securing the line extending from the reel;
    spring-loaded line switch means supported by said housing and engageable by the line for indicating whether the line portion between said clamping means and the rod free end is at a first tension or at a second higher tension;
    selector switch means supported by said housing and including first and second states; and
    indicator means responsive to both said line switch means and said selector switch means for providing an indication that the line portion is at said first tension when said selector switch means is in said first state and that the line portion is at said second tension when said selector switch means is in said second state.

2. A first strike alarm as defined in claim 1 wherein said line switch means is supported in said housing generally opposite the rod.

3. A fish strike alarm as defined in claim 2 wherein said housing comprises means for hingedly connecting said housing relative to the rod whereby the angle between said housing and the rod can be adjusted to vary the pressure exerted on said line switch means by the line.

4. A fish strike alarms as defined in claim 3 wherein said line switch means is supported on said housing generally opposite said hingedly connecting means to increase the pressure exerted on said line switch means by the line.

5. A fish strike alarm as defined in claim 1 wherein said selector switch means further includes a third state wherein said indicator means is disabled.

6. A fish strike alarm as defined in claim 1 wherein said indicator means comprises both illumination means and audible means.

7. A fish strike alarm for a fishing rod having a line supported thereon comprising:
    a housing operably mountable on the rod;
    a spring-loaded switch supported by said housing to be engaged by the line to be moved between at least first and second states;
    clamping means supported on said housing for releasably securing said line proximate said switch whereby said switch is urged to said first state when the line is at a first tension and to said second state when the line is at a second higher tension; and
    warning means responsive to said states of said switch for providing a signal at least when said switch is in one of said switch states.

8. A fish strike alarm as defined in claim 7 wherein said switch reciprocates in a direction generally transverse to the line.

9. A fish strike alarm as defined in claim 7 wherein said switch is supported on said housing generally opposite the rod.

10. A fish strike alarm as defined in claim 9 wherein said switch reciprocates generally toward and away from the rod.

11. A fish strike alarm as defined in claim 7 wherein said housing further comprises means for hingedly mounting said housing relative to the rod whereby the angle between said housing and the rod can be adjusted to vary the pressure exerted on said switch by the line.

12. A fish strike alarm as defined in claim 7 further comprising a selector switch means including first and second states and wherein said warning means is further responsive to said selector switch means for providing said signal when said switch and said selector switch means are in said first states or when said switch and said selector switch means are in said second states.

13. A fish strike alarm as defined in claim 12 wherein said warning means comprises both illumination means and audible means.

14. A fish strike alarm for a fishing rod and reel supporting a fish line, the rod having a handle end on which the reel is mounted and a free end, said alarm comprising:
  a housing operably connectable to said rod;
  clamping means supported on said housing for releasably securing the line
  line switch means supported by the housing to be depressed when the line between said clamping means and the rod free end is taut and to be released when the line is slack;
  selector switch means including first and second states; and
  alarm means responsive to said line switch means and said selector switch means for providing an alarm signal when the line is taut and said selector switch means is in said first state and when the line is slack and said selector switch means is in said second state.

15. A fish strike alarm as defined in claim 14 wherein said selector switch is further movable to a third position wherein said alarm means is disabled.

16. A fish strike alarm as defined in claim 14 wherein said housing further comprises means for hingedly connecting said housing relative to the rod whereby the angle between said housing and the rod can be adjusted to vary the pressure exerted on said switch means by the line.

17. A fish strike alarm as defined in claim 16 wherein said switch means is supported on said housing generally opposite the rod.

18. A fish strike alarm as defined in claim 17 wherein said switch means is located generally opposite said hingedly connecting means to increase the pressure exerted by the taut line on said switch means.

19. A fish strike alarm as defined in claim 18 wherein said alarm means comprises both illumination means and audible means.

20. A fish strike alarm for a fishing rod having a line supported thereon comprising:
  a housing operably mountable on the rod;
  clamping means supported by said housing for releasably securing the line;
  line switch means supported by said housing and engageable by the line and including first, second, and third states indicative of whether the line is at a first tension, a second higher tension, or a third yet higher tension, respectively; and
  indicator means responsive to said line switch means for providing an alarm signal when said line switch means is in at least one of said first and third states.

21. A fish strike alarm as defined in claim 20 wherein said indicator means comprises means for providing said alarm signal when said line switch means is in either said first or third states.

22. A fish strike alarm as defined in claim 20 wherein said housing comprises means for hingedly connecting said housing relative to the rod whereby the angle between said housing and the rod can be adjusted to vary the pressure exerted on said line switch means by the line.

23. A fish strike alarm as defined in claim 22 wherein said line switch means is supported on said housing generally opposite said hingedly connecting means to increase the pressure exerted on said line switch means by the line.

24. A fish strike alarm as defined in claim 20 wherein said indicator means comprises both illumination means and audible means.

25. A fish strike alarm as defined in claim 20 wherein said line switch means comprises:
  a first single pole switch having an actuating arm; and
  a second single pole switch positioned to be actuated by said first switch actuating arm.

26. A fish strike alarm as defined in claim 25 wherein said first switch comprises a microswitch.

* * * * *

UNITED STATES PATENT AND TRADEMARK OFFICE
CERTIFICATE OF CORRECTION

PATENT NO. : 4,447,979
DATED : May 15, 1984
INVENTOR(S) : F. Hoyt Taylor

It is certified that error appears in the above-identified patent and that said Letters Patent is hereby corrected as shown below:

```
Column 2, line 30:
     "first" should be --fish--;

Column 2, line 31:
     "furher" should be --further--;

Column 8, line 27:
     "first" should be --fish--; and

Column 8, line 36:
     "alarms" should be --alarm--.
```

Signed and Sealed this

Nineteenth Day of February 1985

[SEAL]

*Attest:*

DONALD J. QUIGG

*Attesting Officer*   *Acting Commissioner of Patents and Trademarks*